(12) United States Patent
Omar et al.

(10) Patent No.: US 9,300,170 B2
(45) Date of Patent: Mar. 29, 2016

(54) SOLAR ENERGY STATION AND APPLICATION

(71) Applicant: Telekom Malaysia Berhad, Kuala Lumpur (MY)

(72) Inventors: Nurul Afzan Omar, Selangor Darul Ehsan (MY); Ashaari Yusoff, Selangor Darul Ehsan (MY); Mohamed Razman Yahya, Selangor Darul Ehsan (MY); Asban Dolah, Selangor Darul Ehsan (MY); Syamsuri Yaakob, Kuala Lumpur (MY); Norman Fadhil Idham Muhammad, Selangor Darul Ehsan (MY)

(73) Assignee: TELEKOM MALAYSIA BERHAD, Kuala Lumpur (MY)

( * ) Notice: Subject to any disclaimer, the term of this patent is extended or adjusted under 35 U.S.C. 154(b) by 548 days.

(21) Appl. No.: 13/721,529

(22) Filed: Dec. 20, 2012

(65) Prior Publication Data

US 2013/0175866 A1    Jul. 11, 2013

(30) Foreign Application Priority Data

Dec. 28, 2011   (MY) ............................ PI 2011006309

(51) Int. Cl.
  *H02J 9/04*   (2006.01)
  *H02J 3/38*   (2006.01)
  *E04H 1/12*   (2006.01)
  *H01L 31/04*  (2014.01)

(52) U.S. Cl.
  CPC ... *H02J 9/04* (2013.01); *E04H 1/12* (2013.01); *H02J 3/383* (2013.01); *H02S 10/00* (2013.01); *Y02B 10/12* (2013.01); *Y02B 10/14* (2013.01); *Y02E 10/563* (2013.01); *Y10T 307/615* (2015.04)

(58) Field of Classification Search
  CPC ............. H02J 9/04; H02J 3/383; H02S 10/00; E04H 1/12; Y02B 10/14; Y02B 10/12; Y02B 10/563
  See application file for complete search history.

(56) References Cited

U.S. PATENT DOCUMENTS

| | | | | |
|---|---|---|---|---|
| 5,540,383 | A * | 7/1996 | Ducey | 239/1 |
| 7,629,708 | B1 * | 12/2009 | Meyers et al. | 307/66 |
| 2007/0000186 | A1 * | 1/2007 | Adams | 52/74 |
| 2010/0236594 | A1 * | 9/2010 | Hammann | 135/143 |
| 2011/0254372 | A1 * | 10/2011 | Haines et al. | 307/66 |
| 2012/0210946 | A1 * | 8/2012 | Hilgers | 119/443 |

FOREIGN PATENT DOCUMENTS

JP    08-305387    * 11/1996

* cited by examiner

*Primary Examiner* — Rexford Barnie
*Assistant Examiner* — Terrence Willoughby
(74) *Attorney, Agent, or Firm* — Jacobson Holman, PLLC.

(57) ABSTRACT

A system for supplying energy is provided. The system comprises a shelter for users of an outdoor recreational area. The shelter has a roof portion and photovoltaic cells disposed on the roof portion, the photovoltaic cells being arranged to convert solar energy into electrical energy. The system also comprises an energy distribution system arranged to receive converted electrical energy from the photovoltaic cells, and to receive grid electrical energy from a power distribution network. The energy distribution system is arranged to provide converted electrical energy to an electrically powered component of the system at times when there is sufficient converted electrical energy to power the component, and to provide grid electrical energy to the component at times when there is insufficient converted electrical energy to power the component.

17 Claims, 2 Drawing Sheets

SOLAR ENERGY STATION AND APPLICATION

This application claims the priority of Malaysian no. PI 2011006309 filed Dec. 28, 2011, hereby incorporated by reference.

FIELD OF THE INVENTION

The present invention relates to a system for supplying energy.

BACKGROUND OF THE INVENTION

Electrical equipment such as lighting and irrigation systems can be provided for use in recreational areas such as parks and playgrounds. However, this increases ongoing costs associated with maintaining a recreational area due to ongoing power and water costs.

There is therefore a need for technological advancement.

SUMMARY OF THE INVENTION

In accordance with a first aspect of the present invention there is provided a system for supplying energy, the system comprising:
- a shelter for users of an outdoor recreational area, the shelter having a roof portion;
- photovoltaic cells disposed on the roof portion, the photovoltaic cells being arranged to convert solar energy into electrical energy; and
- an energy distribution system arranged to receive converted electrical energy from the photovoltaic cells, and to receive grid electrical energy from a power distribution network, the energy distribution system being arranged to provide converted electrical energy to an electrically powered component of the system at times when there is sufficient converted electrical energy to power the component, and to provide grid electrical energy to the component at times when there is insufficient converted electrical energy to power the component.

The system may be arranged to provide converted electrical energy to the power distribution network, for example when the amount of electrical energy converted by the photovoltaic cells exceeds an amount of energy required by the component of the system.

The system may comprise at least one of the following electrically powered components:
- a lighting system;
- a water distribution system;
- a security system; and
- a climate control system.

The lighting system may be arranged to provide light to a region that is shaded by the shelter and/or to a region external the shaded region. In one embodiment, the system is arranged to power the lighting system via the converted electrical energy so as to light the shaded region when there is sufficient converted electrical energy to do so. The system may also be arranged to power the lighting system via grid electrical energy so as to light the shaded region and/or the external region when there is insufficient converted electrical energy to provide power to light the shaded region.

The water distribution system may comprise a water container and be arranged to divert water received from rainfall to the water container. In one example, the water distribution system is arranged to collect rain water that runs off the roof portion of the shelter.

The water distribution system may comprise an irrigation system arranged to provide water from the water container to plant life in a region around and/or under the shelter. The water distribution system may also comprise a water dispenser for providing water to users of the shelter or surrounding region, the water distribution system being arranged to provide collected water to the water dispenser.

The water distribution system may comprise a pump system for transferring water from the water container to the irrigation system and/or water dispenser, the pump system being powered by the energy distribution system. Further, or alternatively, pressure required to transfer water from the water container to the irrigation system and/or water dispenser may be provided by arranging the water container in an elevated position, such as by mounting the water container directly beneath the roof portion.

The irrigation system may comprise a control system for supplying water to plants at a desired time.

The water distribution system may be arranged to cool water that has been collected, by using energy supplied by the energy distribution system.

The climate control system may be any appropriate system that allows a climate of or around shelter to be at least partially controlled. In one example, the climate control system is arranged to cool and spray water supplied by the water distribution system. The water may be sprayed in a relatively fine mist so as to cool people using the shelter, or in the vicinity of the shelter.

It will be appreciated that the term climate control is intended to include any influence on a climate associated with the system, including ambient temperature, humidity, ventilation etc of a region under or around the shelter.

The security system may comprise an appropriate security monitoring system such as a closed circuit television system or a security system that uses Internet protocol (IP) cameras. The security system is arranged to provide security video to security and/or law enforcement personnel to assist in monitoring the safety of users of the recreational area and to deter vandalism and other acts of antisocial behavior in and around the shelter. The security system is powered by the energy distribution system and can transmit video and/or audio to the security and/or law enforcement personnel via any appropriate means, such as via a wired or wireless connection.

The system may comprise a generation meter arranged to record an amount of electrical energy produced by the photovoltaic cells. In one example, the generation meter is arranged to record a total amount of electrical energy generated by the photovoltaic cells. In a further or alternative example, the generation meter may be arranged to record an amount of excess converted electrical energy that has been provided to the power distribution network.

The system may comprise a consumption meter arranged to record an amount of electrical energy consumed from the power distribution network when the amount of sunlight impinging on the photovoltaic cells is insufficient to power the at least one electrically powered component.

The system may be arranged to interface with the power distribution network if the power distribution network is based on single-phase or three-phase power.

BRIEF DESCRIPTION OF THE DRAWINGS

In order that the present invention may be more clearly ascertained, embodiments of the present invention will now be described, by way of example only, with reference to the accompanying drawings, in which.

DESCRIPTION OF AN EMBODIMENT OF THE INVENTION

Figure 1:
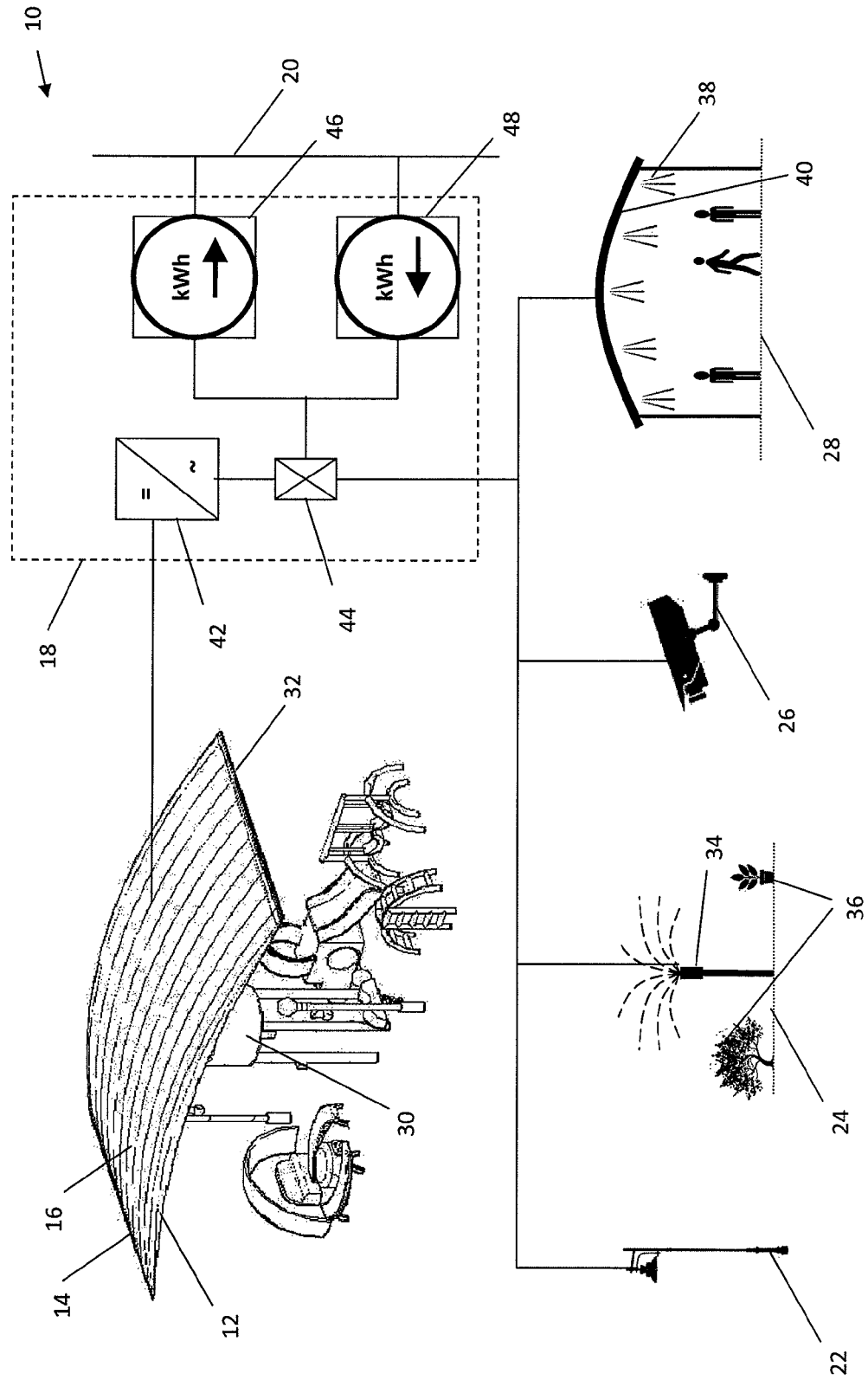
FIG. 1 is a schematic diagram of an energy distribution system in accordance with an embodiment of the present invention.

FIG. 1 shows a schematic diagram of a system 10 for supplying energy. The system 10 comprises a shelter 12 for users of an outdoor recreational area. In this example, the outdoor recreational area is a playground, although it will be appreciated that the outdoor recreational area may be any appropriate recreational area, and will typically be an area with plants or the like that require a supply of water.

The shelter 12 comprises a roof portion 14 having photovoltaic cells 16 disposed thereon. The photovoltaic cells 16 are arranged to convert solar energy into electrical energy. The converted electrical energy is fed to an energy distribution system 18, the energy distribution system 18 being arranged to provide the converted electrical energy to electrically powered components of the system 10. The energy distribution system 18 is also arranged to provide the converted electrical energy to a power distribution network 20, for example at times when an amount of electrical energy converted by the photovoltaic cells 16 exceeds an amount of energy required by the electrically powered components of the system 10.

The energy distribution system 18 is also arranged to receive grid electrical energy from the power distribution network 20 and to provide the grid electrical energy to the electrically powered components at times when there is insufficient converted electrical energy to power the electrically powered components.

By providing excess converted electrical energy to the power distribution network 20, the system 10 can be used to receive credit or payment in return, which can be used to offset or pay for electrical energy drawn from the power distribution network 20 when there is insufficient converted electrical energy to power the electrically powered components of the system 10, for example at night time.

In this example, the system 10 comprises the following electrically powered components:
a lighting system 22;
a water distribution system 24;
a security system 26; and
a climate control system 28.

In this example, the lighting system 22 comprises shelter lights that are arranged to provide light to a region that is shaded by the shelter 12. In general, the shelter lights will be on during the day time as well as at night time to account for the relatively low light conditions in the shaded region. The lighting system 22 also comprises external lights that are arranged to provide light to a region external the shaded region. In general, the external lights will be on during the night time or when low light conditions exist during the day time.

The system 10, particularly the energy distribution system 10, is arranged to power the lighting system 22 via the converted electrical energy so as to light the shaded region when there is sufficient converted electrical energy to do so and to power the lighting system 22 via grid electrical energy so as to light the shaded region and the external region when there is insufficient converted electrical energy to provide power to light the shaded region.

In this way, the lighting system 22 will always be provided with power to provide lighting for users of the recreational area regardless of the time of day or ambient lighting conditions.

The lighting system 22 may comprise a light detector (not shown) arranged to detect an amount of ambient light so as to determine when to turn on the external lights, such as at times when the detected ambient light is below a predetermined threshold level.

The water distribution system 24 comprises a water container 30 and is arranged to divert water received from rainfall to the water container 30. In this example, the water distribution system 24 is arranged to collect rain water that runs off the roof portion 14 of the shelter 12 by means of gutters 32 and a gutter pipe system (not shown) that directs the rain water run off to the water container 30.

The water distribution system 24 comprises an irrigation system 34 arranged to provide water from the water container 30 to plant life 36 in a region around and/or under the shelter 12. The water distribution system 24 also comprises a water dispenser such as a drinking fountain for providing water to users of the recreational area. The water distribution system 24 provides water collected in the water container 30 to the water dispenser. It will be appreciated that the water container 30 may be arranged to filter or otherwise clean the collected water if it is to be provided as potable water to users of the recreational area.

The water distribution system 24 may comprise a pump system for transferring water from the water container 30 to the irrigation system and/or water dispenser, the pump system being powered by the energy distribution system. In this example, the water container 30 is arranged in an elevated position by being mounted below the roof portion 14 but above the ground. This provides at least some of the pressure required to transfer water from the water container 30 to the irrigation system 34 and the water dispenser.

The irrigation system 24 also comprises a control system for supplying water to plants at a desired time, the control system being powered by electrical energy from the energy distribution system 18.

The water distribution system 24 is also arranged to cool water that has been collected, in this example by using energy supplied by the energy distribution system to power a water cooling system (not shown). This water cooling function can be used in conjunction with the climate control system 28, as described in more detail later.

The security system 26 of this example comprises a closed circuit television system. It will be appreciated that any appropriate security monitoring system can be used, such as a security system that uses Internet protocol (IP) cameras.

The security system 26 is arranged to provide security video to security and/or law enforcement personnel to assist in monitoring the safety of users of the recreational area and to deter vandalism and other acts of antisocial behavior in and around the shelter 12. The security system 26 is powered by the energy distribution system 18 and can transmit video and/or audio to the security and/or law enforcement personnel via any appropriate means, such as via a wired or wireless connection.

The climate control system 28 of this example comprises a water spray system 38 arrange to spray water in a relatively fine mist so as to cool users of the recreational area. In this example, the water spray system 38 is mounted on a ceiling 40 of the roof portion 14 and is arranged to direct water mist in a generally downwards direction.

In this example, the water is cooled by the water cooling system of the water distribution system 24 prior to being sprayed by the water spray system 38, thereby increasing the cooling effect provided to users of the recreational area.

It will be appreciated that the climate control system 28 may be any appropriate system that allows a climate of or around shelter 12 to be at least partially controlled.

The energy distribution system 18 will now be described in greater detail.

In this example, the energy distribution system 18 comprises an inverter 42 that is arranged to receive DC electricity from the photovoltaic cells 16 and to convert the DC electricity into AC electricity.

The inverter 42 is connected to an electrical distribution box 44 that is arranged to feed AC electricity to the electrically powered components 22, 24, 26, 28 and/or the power distribution system 20, and to receive AC electricity from the power distribution network 20.

The energy distribution system 18 also comprises a generation meter 46 connected between the distribution box 44 and the power distribution system 20 and arranged to record an amount of electrical energy produced by the photovoltaic cells 16. In this embodiment, the generation meter 46 is arranged to record an amount of excess converted electrical energy that has been provided to the power distribution network 20. In an alternative embodiment, the generation meter 46 may be arranged to record a total amount of electrical energy generated by the photovoltaic cells 16.

The energy distribution system 18 also comprises a consumption meter 48 that is connected between the distribution box 44 and the power distribution system 20 and arranged to record an amount of electrical energy consumed from the power distribution network 20, for example at times when the amount of sunlight impinging on the photovoltaic cells 16 is insufficient to power the electrically powered components of the system 10.

The generation and consumption meters 46, 48 can be used to determine an amount of energy provided to and received from the power distribution network 20 such that power credits and costs of the system 10 can be monitored.

It will be appreciated that the energy distribution system 18 can be arranged to interface with a power distribution network 20 that is based on either single-phase or three-phase power.

Figure 2:
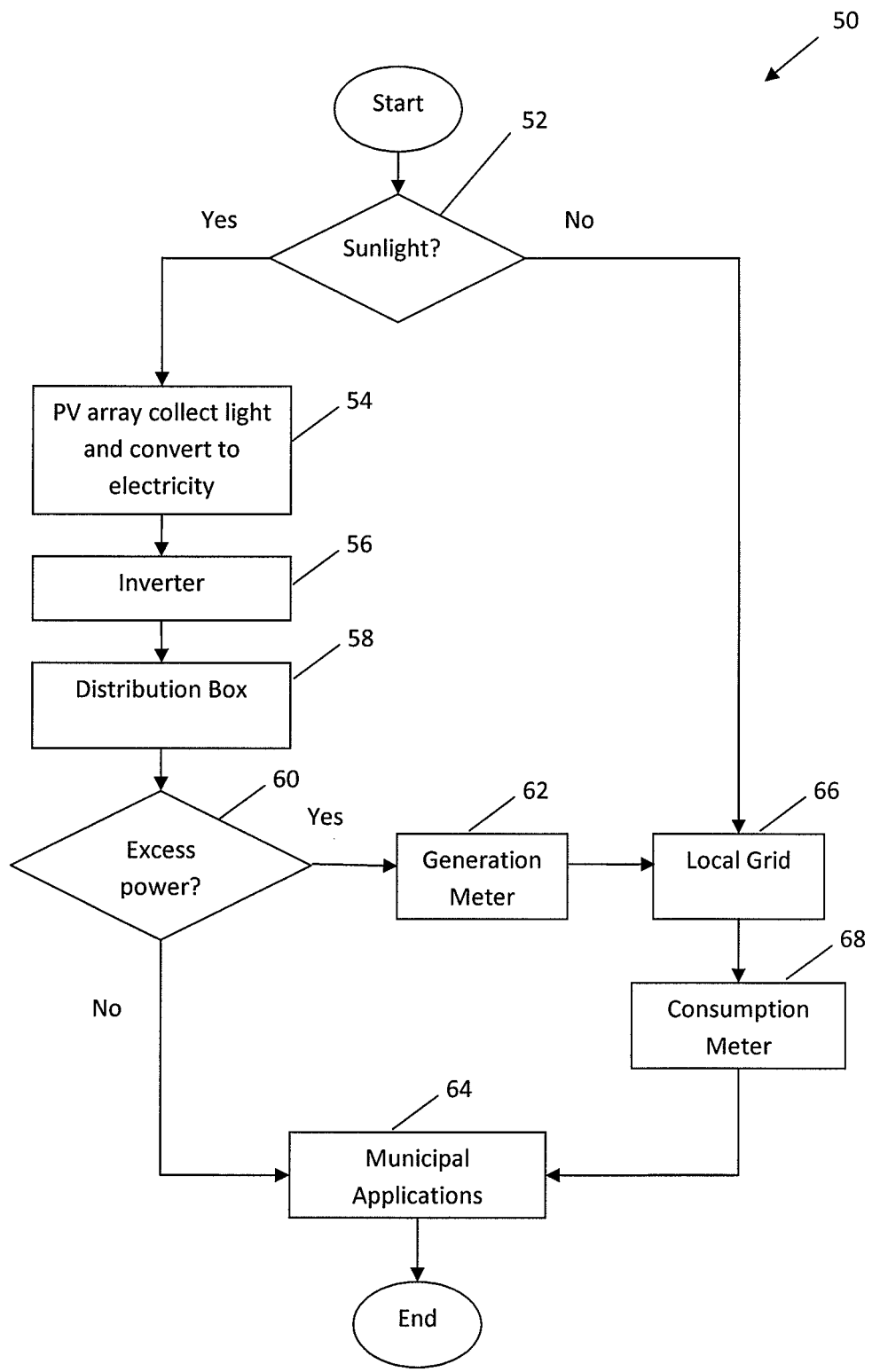
FIG. 2 is a flow diagram of a method of operating the energy distribution system of FIG. 1.

Now that the components of the system 10 have been described, operation of the system 10 will be described with reference to a flow diagram 50 illustrated in FIG. 2.

At a first step 52, the system 10 determines whether there is enough sunlight to power the components 22, 24, 26, 28. This may be done by using a light detector, or based on a measured output of the photovoltaic cells 16. If there is enough sunlight, in a second step 54 the photovoltaic cells 16 convert solar energy into electrical energy and feed the electrical energy to the inverter 42. DC electrical energy is converted 56 to AC electrical energy and the AC electrical energy is fed to the distribution box 44 from where the AC electrical energy can be distributed 58 to the system components and/or power distribution network 20.

In a further determining step 60, it is determined whether any excess electrical energy can be fed to the power distribution network 20. This may be done by comparing the combined load of the system components 22, 24, 26, 28 to the electrical energy output from the photovoltaic cells 16.

If it is determined that there is excess electrical energy, the excess electrical energy is fed to the generation meter 46 where the amount of excess energy is recorded 62 and fed to the electrical distribution network 20.

If it is determined that excess electrical energy cannot be fed to the power distribution network 20, the electrical energy is fed from the distribution box 58 to be used to power 64 the system components 22, 24, 26, 28. If the excess electrical energy is being fed to the power distribution network 20, the remaining electrical energy is used to power 64 the system components 22, 24, 26, 28.

If it is determined in the first step 52 that there is insufficient electrical energy to power 64 the system components 22, 24, 26, 28, then the system 10 is arranged to receive 66 electrical energy from the power distribution system 20. The amount of electrical energy received from the power distribution system 20 is recorded 68 by the consumption meter 48.

Modifications and variations as would be apparent to a skilled addressee are determined to be within the scope of the present invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A system for supplying energy, the system comprising:
   a shelter for users of an outdoor recreational area, the shelter having a roof portion,
   photovoltaic cells disposed on the roof portion, the photovoltaic cells being arranged to convert solar energy into electrical energy; and
   an energy distribution system arranged to receive converted electrical energy from the photovoltaic cells, and to receive grid electrical energy from a power distribution network, the energy distribution system being arranged to provide converted electrical energy to an electrically powered component of the system at times when there is sufficient converted electrical energy to power the component, and to provide grid electrical energy to the component at times when there is insufficient converted electrical energy to power the component;
   wherein the system is arranged to provide converted electrical energy to the power distribution network when the amount of electrical energy converted by the photovoltaic cells exceeds an amount of energy required by the components of the system;
   wherein the system comprises the following electrically powered components:
   a lighting system;
   a water distribution system;
   a security system; and
   a climate control system;
   wherein the system comprises a generation meter arranged to record a total amount of electrical energy produced by the photovoltaic cells;
   wherein the generation meter is arranged to record an amount of excess converted electrical energy that has been provided to the power distribution network; and
   wherein the system comprises a consumption meter arranged to record an amount of electrical energy consumed from the power distribution network when the amount of sunlight impinging on the photovoltaic cells is insufficient to power the electrically powered components.

2. The system of claim 1, wherein the lighting system is arranged to provide light to a region that is shaded by the shelter and/or to a region external the shaded region.

3. The system of claim 2, wherein the system is arranged to power the lighting system via the converted electrical energy so as to light the shaded region when there is sufficient converted electrical energy to do so.

4. The system of claim 2, wherein the system is arranged to power the lighting system via grid electrical energy so as to light the shaded region and/or the external region when there is insufficient converted electrical energy to provide power to light the shaded region.

5. The system of claim 1, wherein the water distribution system comprises a water container and is arranged to divert water received from rainfall to the water container.

6. The system of claim 5, wherein the water distribution system is arranged to collect rain water that runs off the roof portion of the shelter.

7. The system of claim 5, wherein the water distribution system comprises an irrigation system arranged to provide water from the water container to plant life in a region around and/or under the shelter.

8. The system of claim 7, wherein the water distribution system comprises a pump system for transferring water from the water container to the irrigation system and/or water dispenser, the pump system being powered by the energy distribution system.

9. The system of claim 7, wherein at least some of the pressure required to transfer water from the water container to the irrigation system and/or water dispenser is provided by arranging the water container in an elevated position.

10. The system of claim 5, wherein the water distribution system comprises a water dispenser for providing water to users of the shelter or surrounding region, the water distribution system being arranged to provide collected water to the water dispenser.

11. The system of claim 5, wherein the water distribution system is arranged to cool water that has been collected.

12. The system of claim 11, wherein the water distribution system is arranged to cool the collected water by using energy supplied by the energy distribution system.

13. The system of claim 1, wherein the climate control system is any appropriate system that allows a climate of or around shelter to be at least partially controlled.

14. The system of claim 13, wherein the climate control system is arranged to cool and spray water supplied by the water distribution system.

15. The system of claim 14, wherein the water is sprayed in a relatively fine mist so as to cool people using the shelter, or in the vicinity of the shelter.

16. The system of claim 1, wherein the security system is arranged to provide security video to security and/or law enforcement personnel to assist in monitoring the safety of users of the recreational area and/or to deter vandalism and other acts of antisocial behavior in and around the shelter.

17. The system of claim 16, wherein the security system is powered by the energy distribution system.

* * * * *